US006962001B2

(12) United States Patent
Yano et al.

(10) Patent No.: US 6,962,001 B2
(45) Date of Patent: Nov. 8, 2005

(54) MAGNETIC NORTH DETECTING DEVICE AND MAGNETIC NORTH DETECTING METHOD

(75) Inventors: Takeshi Yano, Fujisawa (JP); Kiwamu Shirakawa, Sendai (JP); Nobukiyo Kobayashi, Natori (JP)

(73) Assignee: The Research Institute for Electric and Magnetic Materials, Sendai (JP)

( * ) Notice: Subject to any disclaimer, the term of this patent is extended or adjusted under 35 U.S.C. 154(b) by 0 days.

(21) Appl. No.: 10/982,340

(22) Filed: Nov. 4, 2004

(65) Prior Publication Data

US 2005/0115090 A1 Jun. 2, 2005

(30) Foreign Application Priority Data

Nov. 10, 2003 (JP) ..................................... 2003-417262

(51) Int. Cl.[7] ............................................. G01C 17/06
(52) U.S. Cl. ...................... 33/355 R; 33/1 E; 33/355 D
(58) Field of Search ........................... 33/355 R, 355 D, 33/1 E, 356, 363 R, 364, 402, 351–352

(56) References Cited

U.S. PATENT DOCUMENTS

| | | | | |
|---|---|---|---|---|
| 4,797,841 A | * | 1/1989 | Hatch ........................... | 33/356 |
| 5,525,901 A | * | 6/1996 | Clymer et al. ............. | 33/355 R |
| 5,764,055 A | * | 6/1998 | Kawase ..................... | 33/363 R |
| 6,049,989 A | * | 4/2000 | Lee ........................... | 33/355 R |
| 6,105,265 A | * | 8/2000 | Gloor et al. ............... | 33/355 R |
| 6,539,639 B2 | * | 4/2003 | Smith ......................... | 33/356 |
| 6,701,631 B1 | * | 3/2004 | Monteiro et al. ............. | 33/1 E |
| 6,860,022 B2 | * | 3/2005 | Kato et al. ..................... | 33/356 |
| 2002/0056202 A1 | * | 5/2002 | Tamura ........................ | 33/356 |
| 2002/0100178 A1 | * | 8/2002 | Smith et al. .................. | 33/356 |
| 2003/0151401 A1 | * | 8/2003 | Flament et al. ......... | 324/207.11 |
| 2004/0187328 A1 | * | 9/2004 | Satoh et al. .................. | 33/356 |
| 2005/0072011 A1 | * | 4/2005 | Miyashita et al. ........ | 33/355 R |

OTHER PUBLICATIONS

Application Note AN00022, entitled Electronic Compass Design Using KMZ51 and KMZ52, pp 1–38, published by Philips Semiconductors Systems Laboratory, Hamburg, Germany, Mar. 30, 2000.

* cited by examiner

Primary Examiner—G. Bradley Bennett
Assistant Examiner—Yaritza Guadalupe
(74) Attorney, Agent, or Firm—Frishauf, Holtz, Goodman & Chick, P.C.

(57) ABSTRACT

The magnetic north detecting device comprises: a 3-dimensional geomagnetism sensor unit including three geomagnetism sensors for detecting respective components of a geomagnetism magnetic field intensity in respective directions of three coordinate axes perpendicular to each other; and a 3-dimensional operation functional section for carrying out an operation on the basis of the components of the geomagnetism magnetic field intensity detected by the geomagnetism sensors, and calculating a magnetic north direction of the geomagnetism, and the 3-dimensional operation functional section carries out the operation and calculates the magnetic north direction of the geomagnetism, based on two assumptions that: (i) at least one axis of three coordinate axes of the 3-dimensional geomagnetism sensor unit is level to the earth surface; and (ii) an angle of a geomagnetism magnetic field vector which is calculated from the detected components of the geomagnetism magnetic field intensity, referring to the earth surface, coincides with a dip angle of the geomagnetism which is assumed beforehand.

10 Claims, 7 Drawing Sheets

MAGNETIC NORTH DETECTING DEVICE AND MAGNETIC NORTH DETECTING METHOD

BACKGROUND OF THE INVENTION

1. Field of the Invention

This invention relates to the art of a magnetic north detection for detecting the magnetic north direction, particularly, relates to a magnetic north detecting device and a magnetic north detecting method for detecting a magnetic north direction, based on geomagnetism magnetic filed intensity measured by a 3-dimensional geomagnetism sensor. This invention is applied to mainly to cellular phones.

2. Description of the Related Art

Figure 1:
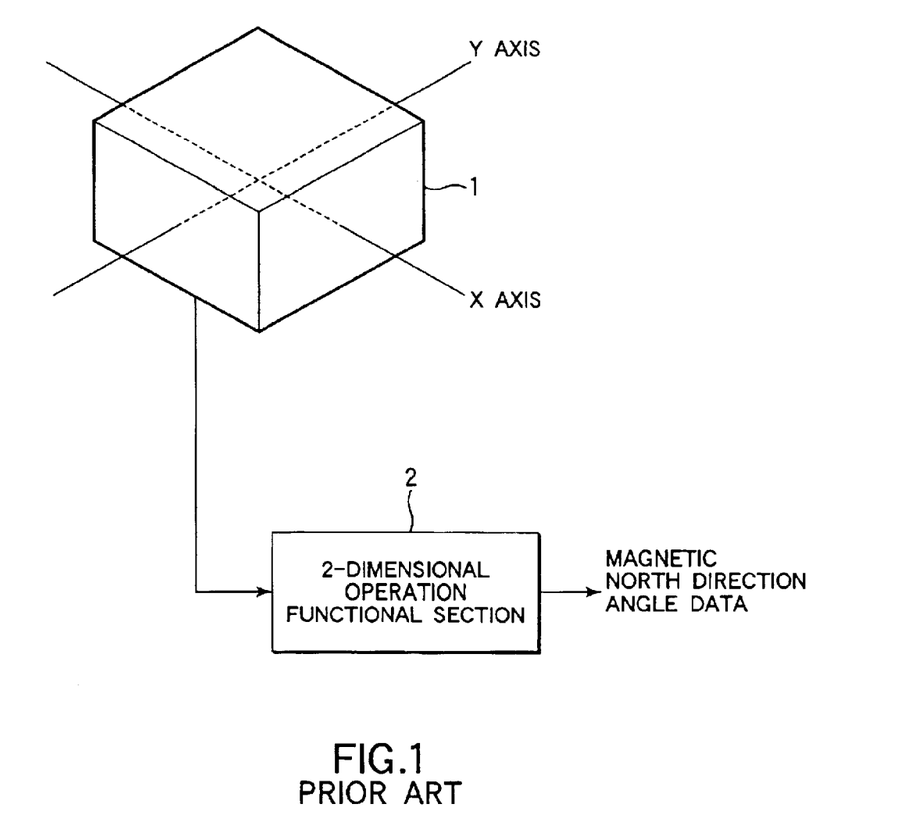
FIG. 1 is a drawing showing the construction of a conventional magnetic north detecting device.

Cellular phones having navigation function are put into practical use. The navigation function usesposition information obtained by a predetermined position detecting means and magnetic north direction calculated by a magnetic north direction sensor for detecting the magnetic north direction based on measuring data of the geomagnetism. As shown in FIG. 1, the magnetic north direction sensor comprises a 2-dimensional geomagnetism sensor unit 1 for detecting geomagnetism magnetic field intensities of two directions perpendicular to each other and a 2-dimensional operation functional section 2 which calculates the magnetic north direction from the geomagnetism magnetic field intensities measured by two geomagnetism sensors included in the 2-dimensional geomagnetism sensor unit 1. The particular magnetic north direction sensor is disclosed in, for example, Application Note AN00022 "Electronic Compass Design using KMZ51 and KMZ52" published by Philips Semiconductors.

The calculation method of the 2-dimensional operation functional section 2 utilizes the following principle. Specifically, when an angle formed by the magnetic north direction and an axis of the sensor is denoted by, for example, Θ, one of two geomagnetism sensors placed on the 2-dimensional plane shows magnetic field intensity proportional to sin(Θ), while the other shows magnetic field intensity proportional to cos(Θ). In order to calculate the magnetic north direction angle Θ backward from the magnetic field intensities measured by two geomagnetism sensors, the ratio of the magnetic field intensities is fined, and tan-1 of the ratio is calculated.

The above-mentioned art, however, requires the premise that the 2-dimensional geomagnetism sensor unit is level to the earth surface. When the sensor unit 1 is not placed on a level to the earth surface, it produces an error in reading of the magnetic north direction. The reason of producing the error is that the geomagnetism direction is not level to the earth surface and, therefore, is inclined to the earth surface by so-called "dip angle". For example, the dip angle in Japan and environs is distributed in a range of about 44 to 59 degrees. In the case of the dip angle of 45 degrees, horizontal and perpendicular components of the geomagnetism magnetic field are equal to each other. Therefore, the perpendicular component is substantially equal to or larger than the horizontal component in Japan and environs. For this reason, when the cellar phone is not being kept level to the earth surface and, thus, the 2-dimensional plane on which the 2-dimensional geomagnetism sensor unit is placed is inclined to the earth surface, i.e., when the geomagnetism sensor unit is inclined to the earth surface, a big error arises in indication of a magnetic north direction. Thus, the error of the magnetic north direction due to the 2-dimensional geomagnetism sensor unit not being kept level to the earth surface is one of the interfering factors in gaining the market share of cellar phones having a magnetic north detecting function.

BRIEF SUMMARY OF THE INVENTION

An object of the present invention is to provide a magnetic north detecting device and magnetic north detecting method which can detect a right direction of the magnetic north even when the geomagnetism sensor unit is inclined to the earth surface.

According to an aspect of the present invention, there is provided a magnetic north detecting device comprising:

a 3-dimensional geomagnetism sensor unit including three geomagnetism sensors for detecting respective components of a geomagnetism magnetic field intensity in respective directions of three coordinate axes perpendicular to each other; and a 3-dimensional operation functional section for carrying out an operation on the basis of the components of the geomagnetism magnetic field intensity detected by the geomagnetism sensors included in the 3-dimensional geomagnetism sensor unit, and calculating a magnetic north direction of the geomagnetism, wherein the 3-dimensional operation functional section carries out the operation and calculates the magnetic north direction of the geomagnetism, based on two assumptions that:

(i) at least one axis of three coordinate axes of the 3-dimensional geomagnetism sensor unit is level to the earth surface; and (ii) an angle of a geomagnetism magnetic field vector which is calculated from the components of the geomagnetism magnetic field intensity in respective directions of the three coordinate axes of the 3-dimensional geomagnetism sensor unit, referring to the earth surface, coincides with a dip angle of the geomagnetism which is assumed beforehand.

According to another aspect of the present invention, there is provided a magnetic north detecting method performed by using a 3-dimensional geomagnetism sensor unit including three geomagnetism sensors for detecting respective components of a geomagnetism magnetic field intensity in respective directions of three coordinate axes perpendicular to each other, the method comprising the steps of:

detecting the respective components of the geomagnetism magnetic field intensity in the respective directions of the three coordinate axes by the three geomagnetism sensors; and carrying out an operation on the basis of the components of the geomagnetism magnetic field intensity detected by the geomagnetism sensors included in the 3-dimensional geomagnetism sensor unit, and calculating a magnetic north direction, wherein the operation is carried out to calculate the magnetic north direction of the geomagnetism, based on two assumptions that:

(i) at least one axis of three coordinate axes of the 3-dimensional geomagnetism sensor unit is level to the earth surface; and (ii) an angle of a geomagnetism magnetic field vector which is calculated from the components of the geomagnetism magnetic field intensity in respective directions of the three coordinate axes of the 3-dimensional geomagnetism sensor unit, referring to the earth surface, coincides with a dip angle of the geomagnetism which is assumed beforehand.

In the above-mentioned construction, if following coordinate rotations of (1) and (2) are carried out, (1) a first coordinate rotation for rotating a coordinate system in which the components Hxs, Hys, and Hzs are expressed, with a first angle around the Xs axis; and (2) a second coordinate rotation for rotating a first conversion coordinate system which is converted by the first coordinate rotation, with a second angle around the Zs' axis, where three axes of the first conversion coordinate system are expressed by Xs', Ys', and Zs', where the three coordinate axes of the 3-dimensional geomagnetism sensor unit are expressed by Xs, Ys, and Zs, respectively, and the components of the geomagnetism magnetic field intensity in the respective directions of the Xs, Ys, and Zs are expressed by Hxs, Hys, and Hzs, respectively, with the result that the first conversion coordinate system is converted to a second conversion coordinate system having axes of Xs", Ys", and Zs", and components of the geomagnetism magnetic field intensity in respective direction of the Xs", Ys", and Zs" are expressed by Hxs", Hys", and Hzs", respectively, the 3-dimensional operation functional section can select the first angle and the second angle to satisfy two conditions simultaneously that:

(α) Hxs"=0; and (β) an angle of a geomagnetism magnetic field vector composed of the Hys" and Hzs" in a Ys"-Zs" plane, referring to the earth surface, coincides with the dip angle of the geomagnetism which is assumed beforehand, and a direction of the Ys" axis corresponding to the selected first angle and second angle is considered to be the magnetic north direction.

In this case, where the first angle, the second angle, and the dip angle which is assumed beforehand are expressed by θ, ψ, and Φ, respectively, the θ and ψ are calculated to simultaneously satisfy following equations (a) and (b), and a direction rotating counterclockwise with an angle Θ which shown in a following equation (c) from the Xs axis can be taken as the magnetic north direction.

$$Hxs \cos \psi + Hys \cos \theta \sin \psi + Hzs \sin \theta \sin \psi = 0 \quad (a)$$

$$\tan \Phi(-Hxs \sin \psi + Hys \cos \theta \cos \psi + Hzs \sin \theta \cos \psi) - Hys \sin \theta + Hzs \cos \theta = 0 \quad (b)$$

$$\Theta = \frac{\pi}{2} - \psi \quad (c)$$

Moreover, the 3-dimensional operation functional section can include a function for finding the θ such that a D value shown in a following equation (e) is substantially equal to zero, by repeating steps of a first step of assuming the θ, a second step of calculating the ψ by using a following equation (d), and a third step of calculating the D value by using the equation (e), in this order.

$$\psi = \tan^{-1}\left(\frac{-Hxs}{Hys\cos\theta + Hzs\sin\theta}\right) \quad (d)$$

$$D = \tan \Phi(-Hxs \sin \psi + Hys \cos \theta \cos \psi + Hzs \sin \theta \cos \psi) - Hys \sin \theta + Hzs \cos \theta \quad (e)$$

In this invention, the 3-dimensional operation functional section can include a function for calculating an absolute value of the geomagnetism magnetic field intensity from the respective components of the geomagnetism magnetic field intensity in the respective directions of the three coordinate axes and carrying out a presumption calculation of the dip angle of the geomagnetism based on the calculated absolute value of the geomagnetism and a correlation data between absolute value of the geomagnetism and dip angle value.

As mentioned above, an object of the present invention is to overcome the defect of producing a big error in indication of the magnetic north direction due to the 2-dimensional geomagnetism sensor unit not being kept level to the earth surface in the case of using a conventional 2-dimensional geomagnetism sensor unit.

One method for preventing the above defect is to add another geomagnetism sensor in addition to the two geomagnetism sensors placed on the 2-dimensional plane, that is, to use a 3-dimensional geomagnetism sensor unit. In this case, the additional sensor is placed on an axis perpendicular to the 2-dimensional plane. However, it is not sufficient to solve the above-mentioned problem merely by using the 3-dimensional geomagnetism sensor unit. This is caused by the fact that, in the case of using the 3-dimensional magnetism sensor unit in a cellular phone, it is impossible for the 3-dimensional magnetism sensor unit itself to specify an angle thereof to the earth surface. To be more specific, if the 3-dimensional geomagnetism sensor unit is employed, it is possible to obtain information on the magnetic field intensity in respective directions of the three axes in sensor coordinate system which is formed by the three geomagnetism sensors included in the sensor unit, but the information on the magnetic field intensity thus obtained has no meaning for finding the magnetic north direction because it is impossible to specify a tilt angle of the 3-dimensional geomagnetism sensor unit from the earth surface.

In order to solve this problem, it is possible to employ a tilt sensor for detecting the tilt angle of the 3-dimensional geomagnetism sensor unit from the earth surface, together with the 3-dimensional geomagnetism sensor unit. However, in this case, since the tilt sensor in addition to the 3-dimensional geomagnetism sensor unit is absolutely necessary, the construction of the magnetic north detecting device is rendered complex and costly.

According to the present invention, the magnetic north detecting device comprises: a 3-dimensional geomagnetism sensor unit including three geomagnetism sensors for detecting respective components of a geomagnetism magnetic field intensity in respective directions of three coordinate axes perpendicular to each other; and a 3-dimensional operation functional section for carrying out an operation on the basis of the components of the geomagnetism magnetic field intensity detected by the geomagnetism sensors included in the 3-dimensional geomagnetism sensor unit, and calculating a magnetic north direction of the geomagnetism. Thus, it is possible to detect the magnetic north direction with high precision without entirely using other kinds of sensors, such as a tilt sensor, even when the 3-dimensional geomagnetism sensor unit is not placed on a level to the earth surface. In other words, it is possible to overcome the problem of error in detecting the magnetic north direction, which was unavoidable in the conventional 2-dimensional geomagnetism sensor unit when the sensor unit is not level to the earth surface, without using any sensors, such as a tilt sensor, other than the geomagnetism sensors. Accordingly, an exact magnetic north direction can be detected by using only the information on the geomagnetism magnetic field intensity measured by the 3-dimensional geomagnetism sensor unit, and therefore the practical effect is very large.

DETAILED DESCRIPTION OF THE INVENTION

The present invention will now be described in detail.

Figure 2:
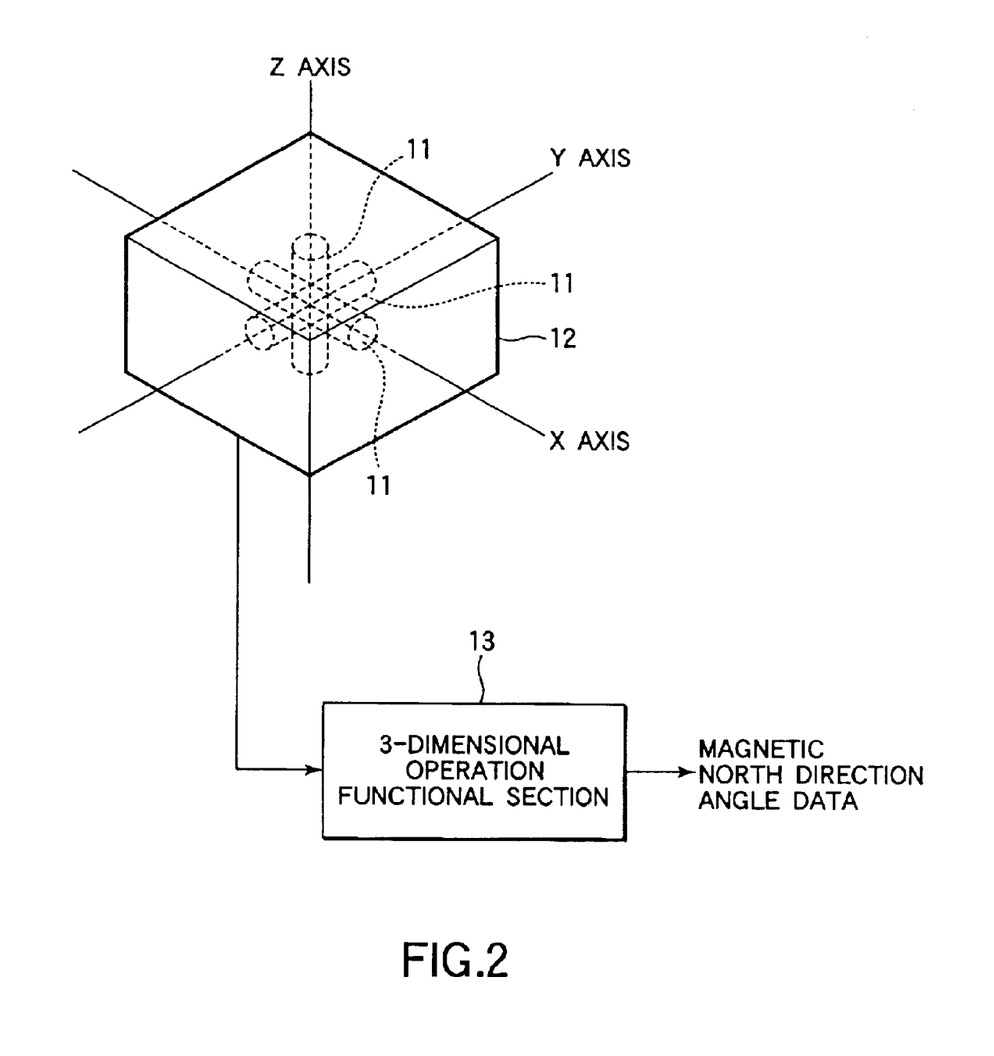
FIG. 2 is a drawing schematically showing the construction of a magnetic north detecting device according to one embodiment of the present invention.

FIG. 2 is a drawing schematically showing the construction of a magnetic north detecting device according to one embodiment of the present invention. The magnetic north detecting device comprises: a 3-dimensional geomagnetism sensor unit 12 having three geomagnetism sensors 11 for detecting respective components of a geomagnetism magnetic field intensity in respective directions of three coordinate axes perpendicular to each other; and a 3-dimensional operation functional section 13 for carrying out an calculation on the basis of the components of the geomagnetism magnetic field intensity detected by the geomagnetism sensors 11, and calculating a magnetic north direction of the geomagnetism.

The respective magnetic sensors 11 detect not only the absolute value of the components of the geomagnetism magnetic field intensity in the respective directions of the three coordinate axes but also their signs of plus or minus.

A geomagnetism sensor based on fluxgate technologies, MI technologies, Hall technologies, GIGS technologies or others is applicable for the geomagnetism sensor of the present invention. Among them, the geomagnetism sensor based on the GIGS technologies in which soft magnetic materials are arranged on both sides of a nano-granular GMR (Giant Magneto Resistant) material is specially fitted for the geomagnetism sensor constituting the 3-dimensional geomagnetism sensor unit 12, because it can be miniaturized.

The 3-dimensional operation functional section 13 detects the magnetic north based on the following technology concept.

Generally, the degrees of freedom specifying a direction of a vector in 3-dimensional space are two. Therefore, it is possible to specify the direction of one vector if two independent conditions, for example, two angles, are defined.

In the present invention, the magnetic north direction is specified under the following two conditions.

(1) The dip angle of the geomagnetism has a solid value which can be predicted beforehand.
(2) In the case where the cellular phone having the magnetic north detecting device is actually used, there is a restriction of a tilt angle of the 3-dimensional geomagnetism sensor unit from the earth surface.

This will be explained in more detail.

According to the Chronological Scientific Tables edited by National Astronomical Observatory, values of the dip angle in Japan vary from 44 to 59 degrees through the whole of Japan, and are all included in 49 degrees (at Tokyo and environs) minus five to plus 10 degrees.

Figure 3:
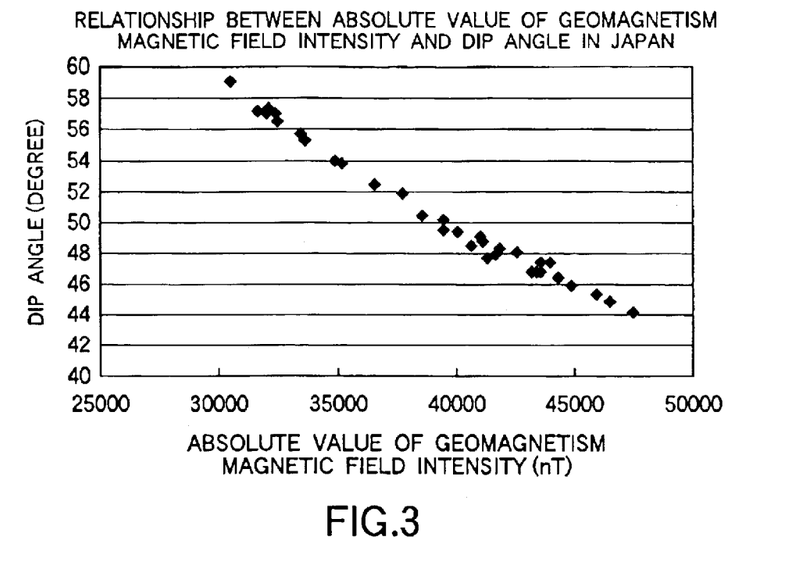
FIG. 3 is a graph showing the relationship between the absolute value of the geomagnetism magnetic field intensity and the dip angle in Japan.

Table 1 shows representative examples of the relationship between the absolute value of the geomagnetism magnetic field intensity and the dip angle of the geomagnetism in various parts of Japan. FIG. 3 is a graph showing the relationship between of the absolute value of the geomagnetism magnetic field intensity and the dip angle in various parts of Japan. The dip angle has a close relationship with the latitude in light of the principle of generation of the dip angle. The reason that the range of the plus side of the dip angle is larger than that of the minus side in Japan is that the Japanese Islands have curved at near Tokyo, and the latitude range of the east area from Tokyo (the east Japan) is larger than that of the west area (the west Japan). Incidentally, 90% of the population of Japan is distributed in a range of latitude corresponding to the dip angle of 49±3 degrees.

| Place Name | Geomagnetism Magnetic Field Intensity (nT) | Dip Angle (degree) |
| --- | --- | --- |
| Wakkanai | 30500 | 58.980 |
| Obihiro | 32500 | 56.340 |
| Hachinohe | 34900 | 54.033 |
| Tochigi | 39500 | 49.460 |
| Matsumoto | 40100 | 49.348 |
| Hamamatsu | 41600 | 47.823 |
| Hiroshima | 42600 | 48.048 |
| Kouchi | 43600 | 46.757 |
| Sasebo | 44000 | 47.313 |
| Hitoyoshi | 46000 | 45.268 |
| Kagoshima | 47500 | 44.105 |

Next, the restriction of the tilt angle of the 3-dimensional geomagnetism sensor unit to the earth surface in the case of actually using the cellular phone, which is another condition, will be explained. Here, for explanation, the tilt angle of the geomagnetism magnetic field sensor unit is replaced by the angle of a cellular phone on the assumption that the 3-dimensional geomagnetism sensor unit included in the magnetic north detecting device according to the present invention is installed in the cellular phone.

Figure 4:
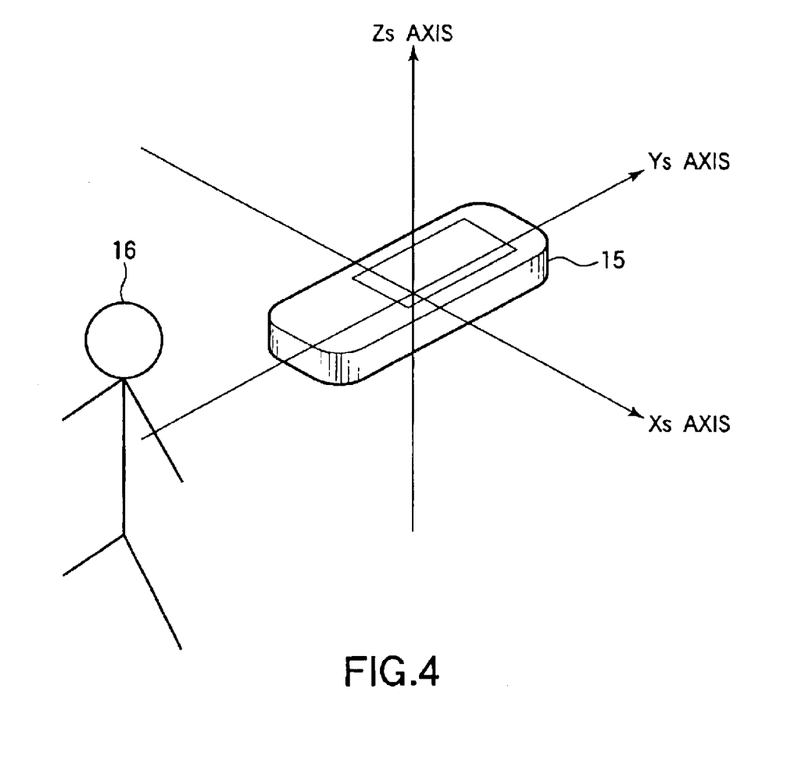
FIG. 4 is a drawing for explaining the case where a cellular phone is placed on a level to the earth surface.
Figure 5:
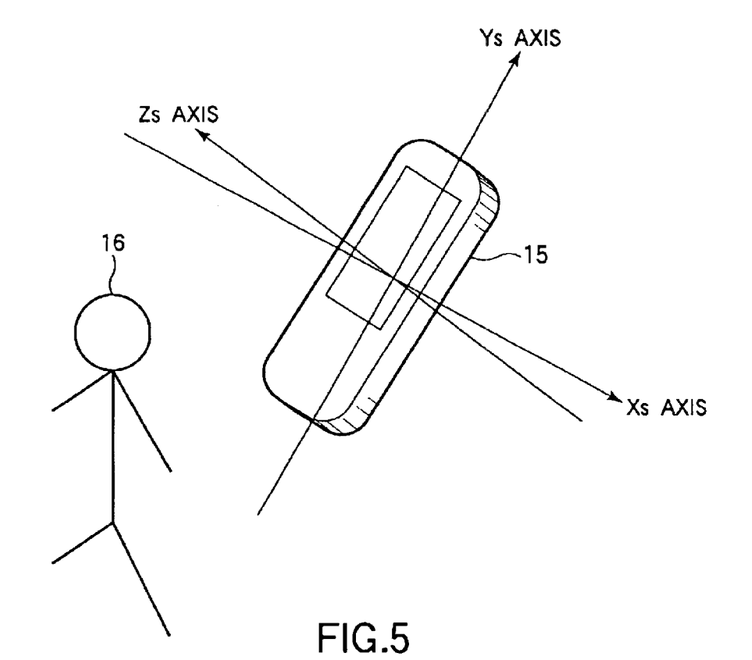
FIG. 5 is a drawing for explaining the case where a cellular phone is inclined at a pitch rotation angle.
Figure 6:
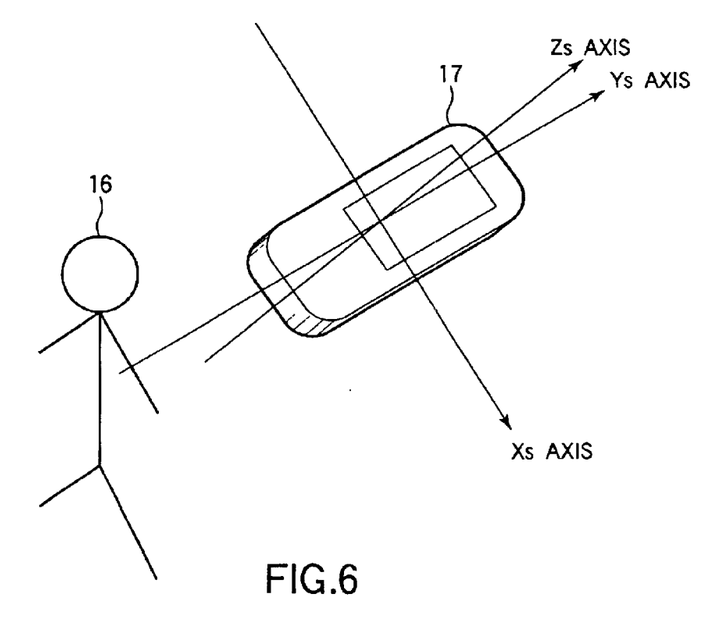
FIG. 6 is a drawing for explaining the case where a cellular phone is inclined at a roll rotation angle.

FIGS. 4, 5, and 6 show a direction of the cellular phone 15 equipped with the magnetic north detecting device including the 3-dimensional geomagnetism sensor unit, and the physical relationship between the cellular phone 15 and a person 16 who uses the cellular phone 15. Three coordinate axes in these drawings are axes of a sensor coordinate system of the geomagnetism sensor unit. An Xs axis extends from left to right, and a Ys axis extends from near side to far side as viewed from the person 16. A Zs axis is perpendicular to both the Xs and Ys axes.

FIG. 4 shows the state where the cellular phone 15 is placed on a level to the earth surface. In this case, both the Xs and Ys axes are horizontal to the earth surface, and the Zs axis is vertical to the earth surface. As previously mentioned, in this case, the correct magnetic north direction can be detected by using two magnetic field components along the Xs and the Ys axes.

However, when the cellular phone 15 is actually used, the cellular phone 15 is not kept level in many cases. For example, in the case where the person put the cellular phone to his ear for a talk, it is considered that the angle of the cellular phone 15 is random, and thus it is difficult to specify the angle of the cellular phone 15. On the other hand, in the case where the person uses the cellular phone 15 for navigation, it is considered that the angle of the cellular phone 15 is not random at all and there is a certain restriction of the angle of the cellular phone. This will be explained below.

Here, suppose that the cellular phone 15 is a ship, and terms relating to a deflection of an angle generally used by a ship is used. Generally, in the case of a ship, a vertical direction deflection is called "pitch", a lateral direction deflection is called "roll" and a deflection of the course is called "yaw". Any case where the cellular phone 15 is inclined is classified into two cases. The first case, which corresponds to a pitch rotation, is that the cellular phone rotates around the Xs axis as shown in FIG. 5. The second case, which corresponds to a roll rotation, is that the cellular phone rotates around the Ys axis as shown in FIG. 6. Since the yaw which is the third deflection is just deflection of a direction to be calculated, the yaw is excluded from an error factor.

First, discussions are given for the pitch. When the cellular phone 15 is actually used for navigation, it is considered that there are more cases where the cellular phone 15 is used with a little upward slant as shown in FIG. 5, than where the cellular phone 15 is placed on a level to the earth surface. In other words, it is natural for the person to use the cellular phone 15 with its screen slanting toward himself, not keeping horizontal. Consequently, it is often the case that the pitch rotation is produced. Even in the case of a flip phone, although a pitch rotation angle is different depending on the magnetic north detecting device install position in the flip phone, i.e., depending on which side of the flip phone is provided with the device, the push button side or the liquid crystal display side, the pitch rotation is also produced.

On the other hand, it is considered that the roll rotation shown in FIG. 6 is hardly produced, because, when using the cellular phone 15 for navigation, it is hard for the person 16 to see the screen of the cellular phone 15 if the cellular phone 15 has a roll rotation angle. Further, it is very unnatural to intentionally incline the cellular phone 15 at such an angle. It should be noted that the foregoing circumstances is based on the assumption that the person 16 who uses the cellular phone 15 stands almost upright. However, the foregoing circumstances are generally true when the person 16 stands without falling down. As a special case, there may be a case that the person 16 who uses the cellular phone 15 lies, but even in this case, it is considered that the person 16 uses the cellular phone 15 on navigation such that the Xs axis is also almost horizontally to the earth surface. This is because, in the case where the Xs axis is inclined to the earth surface, the meaning of a direction on a map shown up in the screen is obscure for the person 16.

Accordingly, in the present invention, only the pitch rotation occurs under the situation that the cellular phone 15 is actually used for navigation, and it is assumed that there is no roll rotation.

As mentioned above, in the present invention, the magnetic north direction is specified on the basis of the two conditions, namely, the dip angle of the geomagnetism and the restriction of the angle of the 3-dimensional geomagnetism sensor unit to the earth surface in the case where the cellular phone 15 is used. Since the degrees of freedom generally specifying the direction of the vector in 3-dimensional space are two, as above-mentioned, it is possible to detect the magnetic north under the above two conditions.

Figure 7:
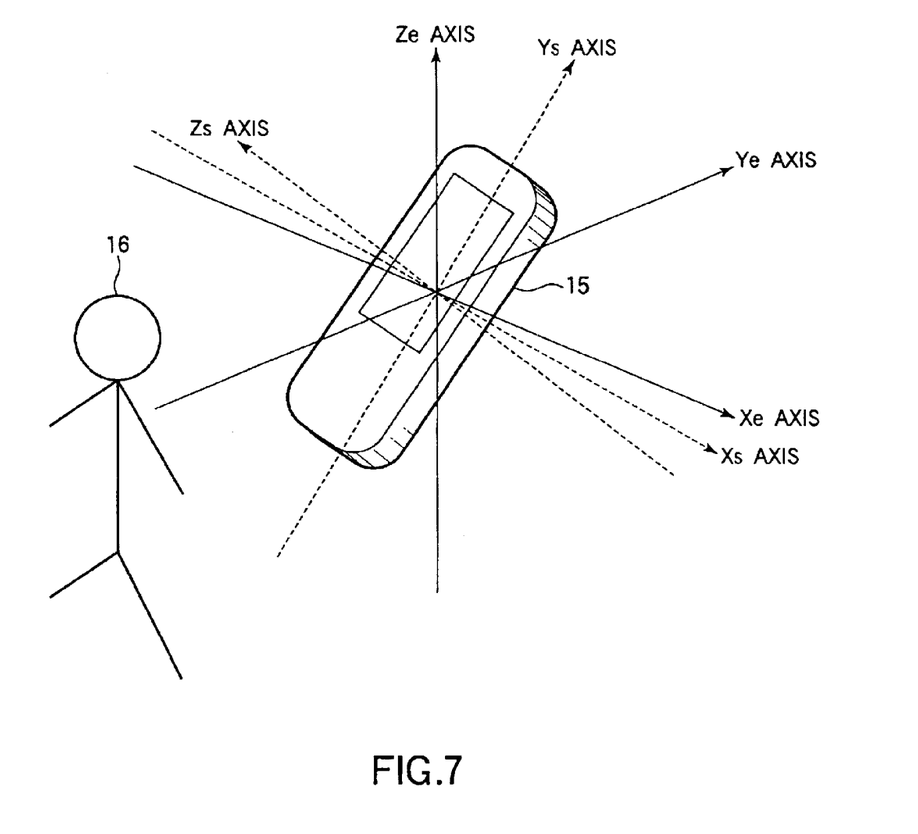
FIG. 7 is a drawing for explaining the sensor coordinate system formed by the 3-dimensional geomagnetism sensor unit and the earth surface coordinate system according to the present invention.

Next, one of the examples of realizing the function in the above-mentioned 3-dimensional calculation functional section 13 will be described. Here, at first, 3-dimensional coordinate system based on the 3-dimensional geomagnetism sensor unit installed in the cellular phone 15 is defined as a sensor coordinate system, and three axes of the sensor coordinate system are expressed by Xs, Ys, and Zs as shown in FIG. 7. The 3-dimensional geomagnetism sensor unit is installed within the cellular phone such that the Xs axis corresponds with the width direction of the cellular phone. The Xs axis extends from left to right as viewed from the person 16 who uses the cellular phone 15. As mentioned above, it is assumed that there is no roll rotation in this invention. This means that the direction of the Xs axis is on a level line (horizontal) to the earth surface. Further, a coordinate system based on the earth is defined as the earth coordinate system having three axes of Xe, Ye, Ze. The Xe and Ye axes are on a level to the earth surface, and the direction of the Ye axis is in agreement with the magnetic north direction. Obviously, the Ze axis is perpendicular to the earth surface.

Now, if suitable coordinate rotation can be applied to the Xs-Ys-Zs sensor coordinate system so that a converted coordinate system converted by the rotation coincides with the Xe-Ye-Ze earth coordinate system, the identification of the magnetic north direction in the sensor coordinate system is possible. In this case, permissible rotations are limited to a rotation around the Xs axis corresponding to the pitch rotation and a rotation around Zs' axis, where three axes of a converted coordinate system after the rotation around the Xs axis are expressed by Xs', Ys', and Zs'. A rotation around the Ys axis is not considered. This corresponds to the basic concept of the present invention in that there is no roll rotation.

In the earth coordinate system, the vector direction of the magnetic field of the geomagnetism is in a plane formed by the Ye and Ze axes and has a predetermined dip angle referring to plane formed by the Xe and Ye axes, i.e. the earth surface.

To sum up, the problem to be solved is to suitably select a first angle and a second angle described below. Specifically, if following two coordinate rotations (1) and (2) are successively carried out, (1) a first coordinate rotation for rotating the sensor coordinate system in which the components Hxs, Hys, and Hzs are expressed, with a first angle around the Xs axis; and (2) a second coordinate rotation for rotating a first conversion coordinate system which is converted by the first coordinate rotation, with a second angle around the Zs' axis, where three axes of the first conversion coordinate system are expressed by Xs', Ys', and Zs', where the components of the geomagnetism magnetic field intensity in the respective directions of the Xs, Ys, and Zs of the sensor coordinate system are expressed by Hxs, Hys, and Hzs, respectively, with the result that the first conversion coordinate system is converted to a second conversion coordinate system having axes of Xs", Ys", and Zs", and components of the geomagnetism magnetic field intensity in respective direction of the Xs", Ys", and Zs" are expressed by Hxs", Hys", and Hzs", respectively, the first angle and the second angle are selected to satisfy two conditions simultaneously that:

(α) Hxs"=0; and (β) an angle of a geomagnetism magnetic field vector composed of the Hys" and Hzs" in a Ys"-Zs" plane, referring to the earth surface, coincides with the dip angle of the geomagnetism which is assumed beforehand.

When the above two conditions of (α) and (β) are satisfied, the Xs", Ys" and Zs" axes coincide with the Xe, Ye and Ze axes of the earth coordinates, respectively.

Since it is premised that the Xs axis is horizontal to the earth surface, the Xs axis is in the plane formed by the Xe and Ye axes of the earth coordinate system. Accordingly, it is possible to specify the magnetic north direction by calculating a magnetic north direction angle Θ which is defined as an angle measured in counterclockwise between the Xs axis and the Ye axis.

Next, the above 3-dimensional calculation function is shown by actual equations.

At first, general equations about a coordinate conversion by a rotation of a coordinate system around a certain straight line will be described. Direction cosines of a directed line "g" passing through the origin of an orthogonal coordinate system Σ are expressed by α, β, γ.

It is presupposed that the coordinate system Σ is moved to the orthogonal coordinates Σ' by the rotation of angle θ of the coordinate system Σ around the straight line "g". Here, a counterclockwise rotation is positive. Then, where coordinates of a point P in the original coordinate system Σ are expressed by Hx, Hy, and Hz, and coordinates after the coordinate rotation are expressed by Hx', Hy', and Hz', the following equations (1)–(3) hold, as shown, for example, Morikita Shuppan Co., Ltd. "Mathematics Handbook" on page 249.

$$Hx'=Hx[\cos \theta+\alpha^2(1-\cos \theta)]+Hy[\gamma \sin \theta+\alpha\beta(1-\cos \theta)]+Hz[-\beta \sin \theta+E\gamma(1-\cos \theta)] \quad (1)$$

$$Hy'=Hx[-\gamma \sin \theta+\beta\alpha(1-\cos \theta)]+Hy[\cos \theta+\beta^2(1-\cos \theta)]+Hz[\alpha \sin \theta+\beta\gamma(1-\cos \theta)] \quad (2)$$

$$Hz'=Hx[\beta \sin \theta+\gamma\alpha(1-\cos \theta)]+Hy[-\alpha \sin \theta+\gamma\beta(1-\cos \theta)]+Hz[\cos \theta+\gamma^2(1-\cos \theta)] \quad (3)$$

The above general equations are applied to the magnetic field intensity of the geomagnetism. First, when the straight line "g" is in agreement with Xs axis, the following equation (4) holds.

$$\alpha=1, \beta=0, \gamma=0 \quad (4)$$

Where the components of the geomagnetism magnetic field intensity along the Xs, Ys and Zs axes are expressed by Hxs, Hys, and Hzs, respectively, three axes of a first conversion coordinate system obtained by the coordinate rotation of the sensor coordinate system having such components of the geomagnetism magnetic field intensity with angle θ around the Xs axis are expressed by Xs', Ys' and Zs', and the components of the magnetic field intensity along the Xs', Ys' and Zs' axes are expressed by Hxs', Hys', and Hzs', respectively, if using the equations (1)–(3) and substituting the equation (4) into the equations (1)–(3), the following equation (5)–(7) are obtained.

$$Hxs'=Hxs \quad (5)$$

$$Hys'=Hys \cos \theta+Hzs \sin \theta \quad (6)$$

$$Hzs'=-Hys \sin \theta+Hzs \cos \theta \quad (7)$$

Next, a rotation with an angle ψ around the Zs' axis is applied to the first conversion coordinate system. When the line "g" is in agreement with the Zs' axis, the following equation (8) is obtained.

$$\alpha=0, \beta=0, \gamma=1 \quad (8)$$

If three axes of a second conversion coordinate system obtained by the coordinate rotation of the first conversion coordinate system with angle ψ around the Zs' axis are expressed by Xs", Ys", and the Zs", and the components of the magnetic field intensity along the Xs", Ys", and the Zs" axes are expressed by Hxs", Hys", and Hzs", respectively, if using the equations (1)–(3) and substituting the equation (8) into the equations (1)–(3), the following equations (9)–(11) are obtained.

$$Hxs''=Hxs'\cos \psi+Hys'\sin \psi \quad (9)$$

$$Hys''=-Hxs'\sin \psi+Hys'\cos \psi \quad (10)$$

$$Hzs''=Hzs' \quad (11)$$

When the equations (5)–(7) are substituted in the equations (9)–(11), the following equations (12)–(14) representing the situation where the coordinate rotation with the angle θ around the Xs axis and the coordinate rotation with the angle ψ around the Zs' axis are successively performed.

$$Hxs''=Hxs \cos \psi+Hys \cos \theta \sin \psi+Hzs \sin \theta \sin \psi \quad (12)$$

$$Hys''=-Hxs \sin \psi+Hys \cos \theta \cos \psi+Hzs \sin \theta \cos \psi \quad (13)$$

$$Hzs''=-Hys \sin \theta+Hzs \cos \theta \quad (14)$$

Now the problem to be solved is to find out the angles θ and ψ satisfying the following two conditions simultaneously that:

(α) Hxs"=0; and (β) an angle of a geomagnetism magnetic field vector composed of the Hys" and Hzs" in the Ys"-Zs" plane, referring to the plane formed by the Xe and Ye axes, i.e., referring to the earth surface, coincides with the dip angle of the geomagnetism which is assumed beforehand.

The condition of (α) is shown by the following equation (15).

$$Hxs \cos \psi+Hys \cos \theta \sin \psi+Hzs \sin \theta \sin \psi=0 \quad (15)$$

Next, with respect to the condition of (β), the condition under which the angle of the geomagnetism magnetic field vector composed of the Hys" and Hzs" in the Ys"-Zs" plane, referring to the earth surface, coincides with a predetermined dip angle of the geomagnetism is obtained. When each value of θ and ψ is given to satisfy the equation (15), the Hxs" becomes 0, i.e., the geomagnetism magnetic field vector is in the plane formed by the Ys" and Zs" axes. Accordingly, if the each value of θ and ψ satisfying the equation (15) are given, there is a relationship among an angle φ, the Hys" of the equation (13), and the Hzs" of the equation (14) as shown in the following equation (16), where an angle of the geomagnetism magnetic field vector measured from the earth surface is expressed by φ. Here, the angle φ is taken in counterclockwise from the Hys" axis.

$$\tan\phi = \frac{-Hys\sin\theta + Hzs\cos\theta}{-Hxs\sin\psi + Hys\cos\theta\cos\psi + Hzs\sin\theta\cos\psi} \quad (16)$$

Since the dip angle $\Phi$ is taken in clockwise from Ye axis, the relationship between the $\phi$ and the $\Phi$ is shown by the following equation (17).

$$\phi = -\Phi \quad (17)$$

Therefore, the right side of the equation (16) can be replaced from $\phi$ to $\Phi$ as shown in the following equation (18).

$$\tan\phi = -\tan\Phi \quad (18)$$

Accordingly, if the equation (18) is substituted in the equation (16), the following equation (19) is obtained.

$$-\tan\Phi = \frac{-Hys\sin\theta + Hzs\cos\theta}{-Hxs\sin\psi + Hys\cos\theta\cos\psi + Hzs\sin\theta\cos\psi} \quad (19)$$

Here, when the values of $\theta$ and $\psi$ are taken to simultaneously satisfy the equation (15) and (19), the Xs", Ys" and Zs" axes coincide with the Xe, Ye, and Ze axes of the earth coordinate system based on the earth, respectively. In this case, the calculation specifying the magnetic north direction is shown below.

In the earth coordinate system, the plane formed by the Xe and Ye axes is level to the earth surface, and the magnetic north direction coincides with the Ye axis. From the basic concept of the present invention, the Xs axis of the sensor coordinate system is in the plane formed by the Xe and Ye axes in the earth coordinate system. Therefore, it is possible to specify the magnetic north direction by finding an angle of the Ye axis from the Xs axis. To be more specific, it is possible to specify the magnetic north direction by calculating the magnetic north direction angle $\Theta$ which is defined as the angle measured in counterclockwise between the Xs and Ye axes. In order to clarify the relationship between the magnetic north direction angle and the second angle in the second coordinate rotation, a vector pointing to the Xs axis, which is expressed by the components of the geomagnetism magnetic field intensity of the following equation (20), is assumed, and the change of vector direction is calculated by applying the first and second coordinate rotations to the sensor coordinate system.

$$Hxs=1, Hys=0, Hzs=0 \quad (20)$$

The following equations (21)–(23) is obtained by substituting the equation (20) in the equations (12)–(14).

$$Hxs''=\cos\psi \quad (21)$$

$$Hys''=-\sin\psi \quad (22)$$

$$Hzs''=0 \quad (23)$$

This vector, i.e. the Xs axis-pointing-vector referring to the earth coordinate system after the rotations, is in the plane formed by the Xe and Ye axes and rotates in clockwise at an angle $\psi$ from the Xe axis. The clockwise means a minus angle rotation. Here, care must be taken to the sign of the angle. In the above calculation process, at first, the coordinates based on the sensor unit and the magnetic fields on this coordinates are assumed, then, the coordinate rotations by which the sensor coordinate system becomes identical to the earth coordinate system were carried out. If the sensor coordinate system becomes identical to the earth coordinate system by selecting the angles $\theta$ and $\psi$, then, it means that the sensor coordinate system was originally rotated at the angles $-\theta$ and $-\psi$ referring to the earth coordinate system. Further, the magnetic north direction is the Ye axis direction, and therefore, in order to get the magnetic north direction angle referring to the Xs axis, $\pi/2$ must be added to the above-mentioned result. Therefore, if the above magnetic north direction angle $\Theta$ is expressed by using $\psi$, the following equation (24) is obtained.

$$\Theta = \frac{\pi}{2} - \psi \quad (24)$$

Next, an actual procedure calculating the magnetic north direction angle is shown below.

By rearranging terms relating to $\psi$ to the left side, and terms relating to $\theta$ to the right side in the equation (15), the following equation (25) is obtained.

$$\tan\psi = \frac{\sin\psi}{\cos\psi} = \frac{-Hxs}{Hys\cos\theta + Hzs\sin\theta} \quad (25)$$

If the equation (25) is solved with respect to the $\psi$, the following equation (26) is obtained.

$$\psi = \tan^{-1}\left(\frac{-Hxs}{Hys\cos\theta + Hzs\sin\theta}\right) \quad (26)$$

If the dip angle $\Phi$ of the geomagnetism can be beforehand calculated with another means, since $\tan\Phi$ of the equation (19) is calculable, the equation (19) can be expanded as the following the equation (27).

$$D=\tan\Phi(-Hxs\sin\psi + Hys\cos\theta\cos\psi + Hzs\sin\theta\cos\psi) - Hys\sin\theta + Hzs\cos\theta \quad (27)$$

Figure 8:
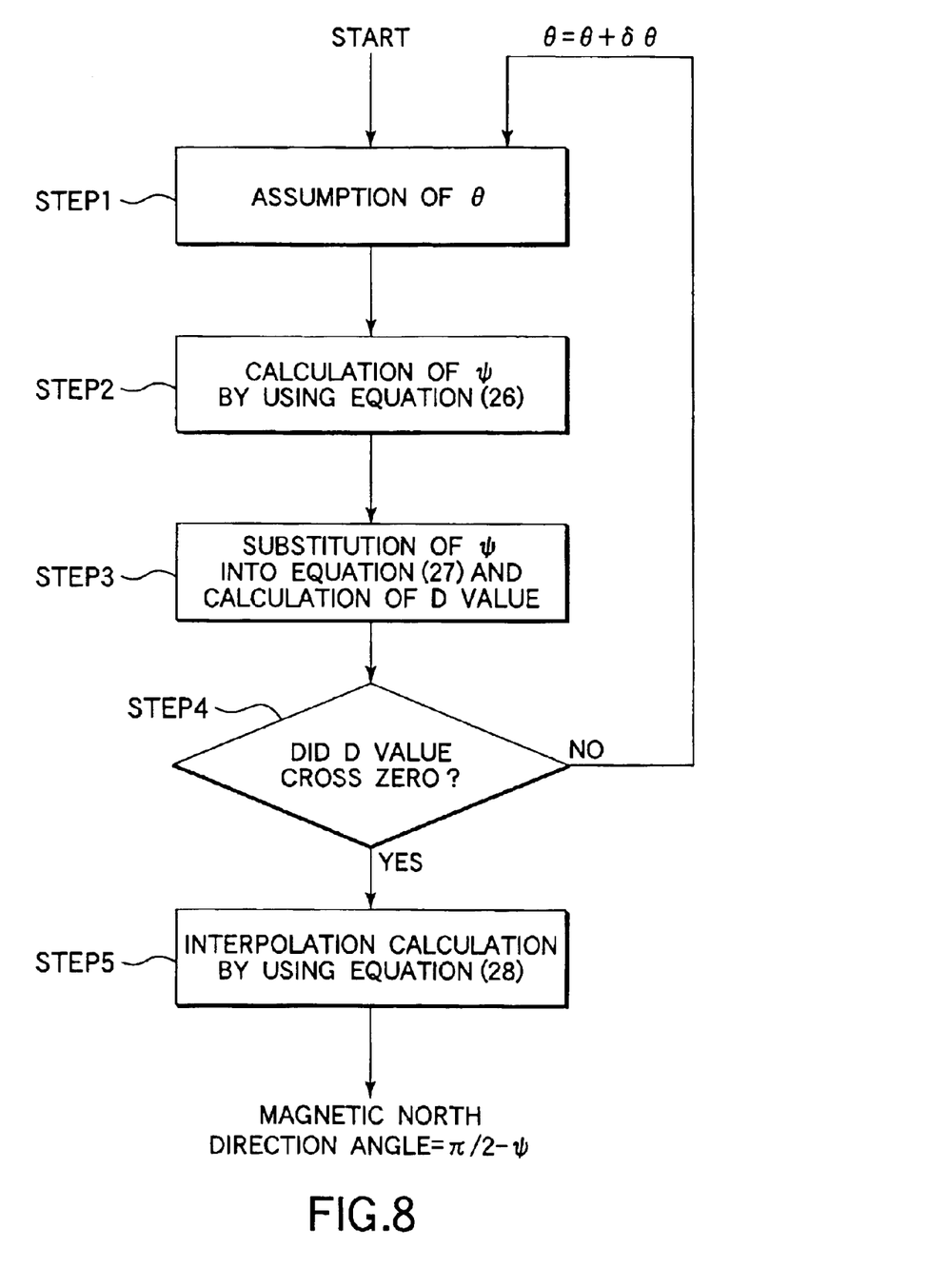
FIG. 8 is a flow chart explaining the actual algorithm in the 3-dimensional operation functional section used for the magnetic north detecting device according to the present invention.

Here, if the equation (19) is satisfied, then the D value in the equation (27) becomes zero. In order to calculate the $\theta$ value which corresponds to D=0 in equation (27), an algorithm as shown in FIG. 8 can be used. Hereafter, the algorithm is explained.

At first, $\theta=0$ is assumed (STEP 1) and $\psi$ is calculated by using the equation (26) (STEP 2). In this case, since the $\tan^{-1}$ routine generally takes an angle between $-\pi/2$ to $\pi/2$ (principal value), a correct value of $\psi$ cannot be obtained by only taking $\tan^{-1}$. In order to get the correct $\psi$ value, it is necessary to modify the value based on the rule shown in Table 2 by classification of the cases. That is, when an absolute value of the $\tan^{-1}$ routine is expressed by $\psi'$, the correct $\psi$ needs to be modified by the operation shown in Table 2 to $\psi'$.

TABLE 2

| Case | Sign of −Hxs | Sign of Hyscos$\theta$ + Hzssin$\theta$ | $\psi$ |
| --- | --- | --- | --- |
| 1 | + | + | $\psi = \psi'$ |
| 2 | + | − | $\psi = \pi - \psi'$ |
| 3 | − | − | $\psi = -\pi + \psi'$ |
| 4 | − | + | $\psi = -\psi'$ |

When $\psi$ of the equation (26) is calculated considering the modification shown in Table 2, then, the value of the $\psi$ is substituted into the equation (27), and the D value is calculated (STEP 3).

Next, suitable δθ is selected, followed by substituting the θ+δ for θ, and the D is calculated again by the same procedure as STEP 1 to STEP 3, then acquired D value is expressed by D'. The step value of δθ should be suitably determined on the balance of required calculation accuracy and computation time.

If the result of this calculation is |D'|<|D|, θ+2δθ and θ+3δθ and so on are substituted for θ by turns, then the D values are calculated, and it is judged whether sign of the D value changed (or crossed zero) (STEP 4). In the step where the D value crossed zero, the algorithm escapes from the routine of STEP 1 to STEP 3 and jumps to STEP 5.

In case of |D'|>|D|, the calculation of the same procedure as described above is applied by transposing the value δθ to −δθ. In the step where the D value crossed zero in STEP 4 as above stated, the algorithm proceeds to STEP 5, and then interpolation calculation is performed.

In the state where the algorithm proceeds to STEP 5, the D value is in the state just after crossed zero. In this state, the θ values and the D values corresponding to the state just before and just after the D crossed zero are expressed by symbols as shown in Table 3, respectively.

TABLE 3

| State | θ | D |
|---|---|---|
| State just before D crossed zero | θ1 | D1 |
| State just after D crossed zero | θ2 | D2 |

θx corresponding to θ at D=0 is calculable by using the interpolation formula shown in the following equation (28) in terms of symbols shown in Table 3.

$$\theta x = \frac{D1 \cdot \theta 2 - D2 \cdot \theta 1}{D1 - D2} \quad (28)$$

Next, the 3-dimensional calculation function calculating the dip angle values with more accuracy by using the correlation between the absolute value of the geomagnetism magnetic field intensity and the dip angle of the geomagnetism will be described. As previously mentioned, Table 1 shows representative examples of the relationship between the absolute value of the geomagnetism magnetic field intensity and the dip angle of the geomagnetism in various parts of Japan according to the Chronological Scientific Tables edited by National Astronomical Observatory. FIG. 3 is a graph showing the same relationship. As shown in FIG. 3, there is a clear correlation in which the dip angle value decreases as the absolute value of the geomagnetism magnetic field intensity increases. Referring to this correlation, if we know the absolute value of the geomagnetism magnetic field intensity, it is possible to presume the dip angle more accurately. Since the absolute value of the geomagnetism magnetic field intensity is a quantity unrelated to the tilt angle of the 3-dimensional geomagnetism sensor unit, the absolute value of the geomagnetism magnetic field intensity can always be calculated when the 3-dimensional magnetic field intensity is measured. As a technique of calculation, calculating the dip angle from the absolute value of the geomagnetism magnetic field intensity can be performed by expressing the graph shown in FIG. 3 in the form of a power series.

Although FIG. 3 shows an example of Japan, similar correlation holds in everywhere on the earth. An overall tendency has a dense relation with the latitude. The absolute value of the geomagnetism magnetic field intensity gradually decreases, while the dip angle gradually increases, as the latitude increases from the equator to the two poles. If this correlation is expressed by the approximated curve, it is also possible to presume the dip angle from the absolute value of the geomagnetism magnetic field intensity in a global scale.

Figure 9:
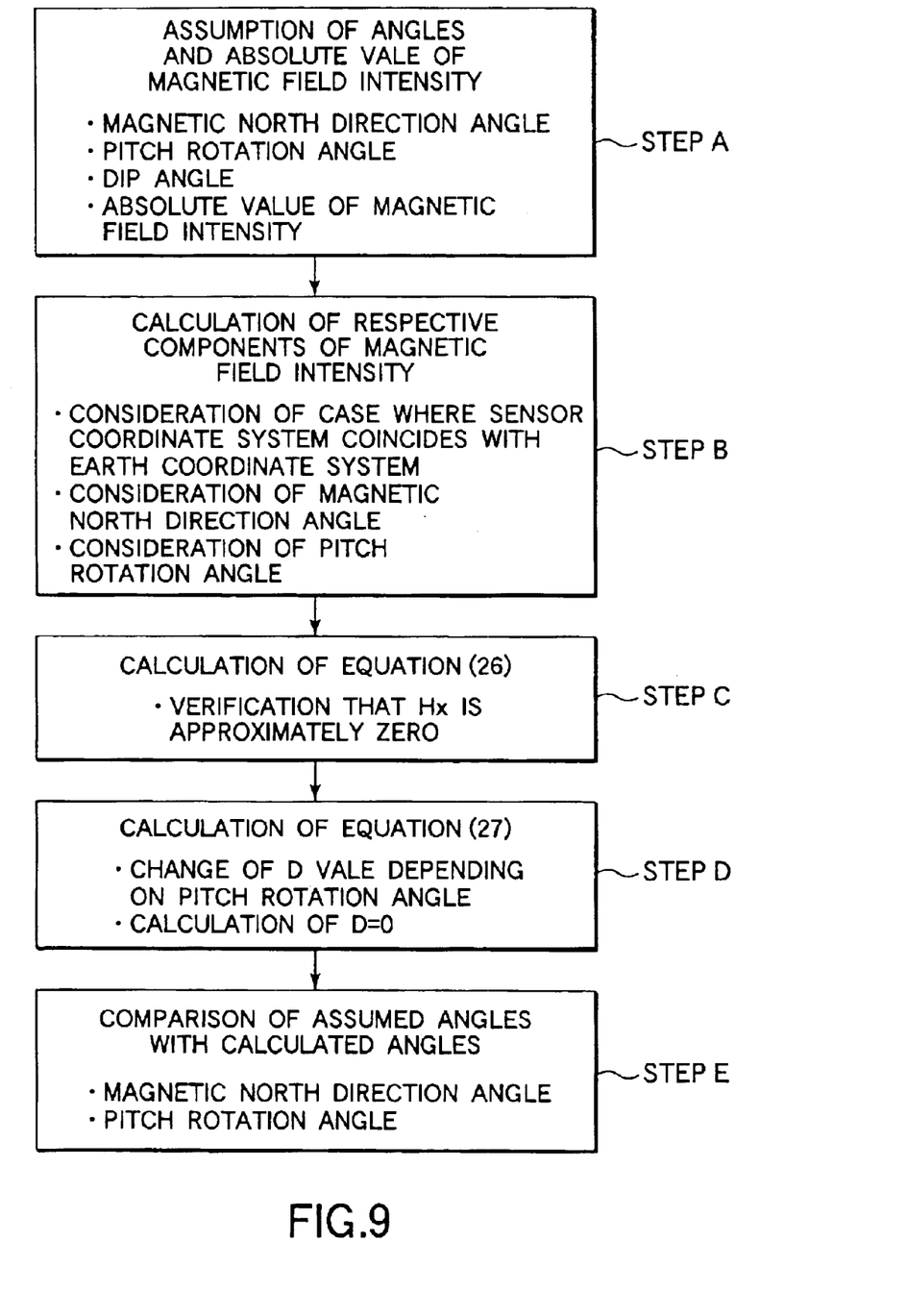
FIG. 9 is a flow chart explaining the calculation procedure of the numerical example to actually find a magnetic north direction according to the present invention.

Now, numerical example of the calculation procedure shown in FIG. 9 to actually find a magnetic north direction according to the present invention sill be explained. This numerical example is constructed something like a blindfold game. At first, the magnetic north direction angle, the pitch rotation angle, the dip angle and the absolute value of the geomagnetism magnetic intensity are assumed as an example. Then, the magnetic field intensity which will be measured by the 3-dimensional geomagnetism sensor unit is estimated. Now a problem here is to rightly guess the initially assumed angles, by using the estimated magnetic field intensity data and the calculation procedure according to the present invention. For this purpose, an example of θ value is applied to the equation (26) and ω value will be calculated, then, it will be verified that the Hxs" component becomes zero when the θ and ψ satisfying the equation (26) are substituted into the equations (12)–(13). However, in the case of this example, the angle formed by the Hys" and Hzs" is not in agreement with the dip angle. The reason of this disagreement is that the selected θ value is not suitable. Then, the calculation for finding suitable θ value which satisfies the dip angle condition will be shown. And finally we will successfully guess the initially assumed angles.

1. Assumption of the angles and the absolute vale of the geomagnetism magnetic field intensity (STEP A)

The angles and the absolute value of the geomagnetism magnetic field intensity are assumed as follows.

| | |
|---|---|
| Magnetic north direction angle | 130 degrees |
| Pitch rotation angle | 30 degrees |
| Dip angle | 50 degrees |
| Absolute value of the geomagnetism magnetic field intensity | 40 μT |

2. Calculation of the components of the geomagnetism magnetic field intensity (STEP B)

(i) Magnetic north direction angle: 90 degrees, pitch rotation angle: zero

If the sensor coordinate system coincides with the earth coordinate system, the components of the geomagnetism magnetic field intensity become as follows.

$$Hx=0 \quad (29)$$

$$Hy=2.57\times10^{-5} \quad (30)$$

$$Hz=-3.06\times10^{-5} \quad (31)$$

(ii) Magnetic north direction angle: 130 degrees, pitch rotation angle: zero

When only the magnetic north direction angle of 130 degrees is taken into account, the components of the geomagnetism magnetic field intensity are as follows.

$$Hx=-1.65\times10^{-5} \quad (32)$$

$$Hy=1.97\times10^{-5} \quad (33)$$

$$Hz=-3.06\times10^{-5} \quad (34)$$

(iii) Magnetic north direction angle: 130 degrees, pitch rotation angle: 30 degrees When the pitch rotation angle of 30 degrees is further taken into consideration to the above, the components of the geomagnetism magnetic field intensity become as follows.

$$Hx = -1.65 \times 10^{-5} \quad (35)$$

$$Hy = 3.24 \times 10^{-5} \quad (36)$$

$$Hz = -1.67 \times 10^{-5} \quad (37)$$

Here, we got the geomagnetism magnetic field intensity data corresponding to the assumed angles. These components of the geomagnetism magnetic filed intensity are just components which will be measured by the geomagnetism sensors. Now the problem is to rightly guess the initially assumed angles, by using the above geomagnetism magnetic field intensity data as a clue.

3. Calculation of equation (26) (STEP C)

At first, suppose that the pitch rotation angle $\theta$ of 20 degrees differing from the initially assumed angle is given. If the pitch rotation angle $\theta$ of 20 degrees is substituted into the equation (26), the $\psi$ value is obtained as shown in the following equation (38).

$$\psi = 96.98 \text{ degrees} \quad (38)$$

Then, if a coordinate rotation is applied to the coordinate system having the components of the geomagnetism magnetic field intensity expressed by the equations (35)–(37) in a manner such that the pitch rotation angle is −20 degrees, the components of the geomagnetism magnetic field intensity are obtained as shown in the following equations (39)–(41).

$$Hx = -1.65 \times 10^{-5} \quad (39)$$

$$Hy = 2.02 \times 10^{-5} \quad (40)$$

$$Hz = -3.64 \times 10^{-5} \quad (41)$$

And then, if the coordinate rotation is applied to the coordinate system having the components of the geomagnetism magnetic field intensity expressed by the equations (39)–(41) in a manner such that the angle $\psi$ is −96.98 degrees, the components of the geomagnetism magnetic field intensity are obtained as shown in the following equations (42)–(44).

$$Hx = -4.39 \times 10^{-11} \quad (42)$$

$$Hy = 1.67 \times 10^{-5} \quad (43)$$

$$Hz = -3.64 \times 10^{-5} \quad (44)$$

To be more specific, when the coordinate rotations are applied to the coordinate system having the components of the geomagnetism magnetic field intensity expressed by the equations (35)–(37) in a manner such that the pitch rotation angle and the angle $\psi$ are traced conversely, it is found that the Hx component becomes approximately zero. This means that the equation (26) is valid.

4. Calculation of equation (27) (STEP D) and comparison of assumed angles with calculated angles (STEP E)

Where the pitch rotation angle $\theta = 20$ degrees and $\psi = 96.98$ degrees are substituted into the equation (27), D value of $8.7 \times 10^{-6}$ which is nonzero is obtained. This means that the actual dip angle corresponding to $\theta = 20$ degrees and $\psi = 96.98$ degrees does not coincide with the dip angle of 50 degrees which is assumed beforehand. If the components of the geomagnetism magnetic field intensity expressed by the equations (35)–(37) and $\theta = 20$ degrees and $\psi = 96.98$ degrees are substituted into the equation (19), the actual dip angle of 42.0 degrees, which differs from the beforehand assumed dip angle of 50 degrees, is obtained. The cause of this disagreement is due to unsuitable select of $\theta$ value. In order to find suitable $\theta$ value, relationship between the $\theta$ value and the D value is calculated. Calculated results are as shown in the following Table 4.

TABLE 4

| Pitch Rotation Angle $\theta$ (degree) | $\psi$ (degree) | Dip Angle (degree) | D |
|---|---|---|---|
| −30 | −24.4 | −2.49 | $4.94 \times 10^{-5}$ |
| −20 | −24.6 | 6.62 | $4.27 \times 10^{-5}$ |
| −10 | −25.4 | 15.7 | $3.51 \times 10^{-5}$ |
| 0 | −27.0 | 24.7 | $2.66 \times 10^{-5}$ |
| 10 | −29.7 | 33.5 | $1.77 \times 10^{-5}$ |
| 20 | −33.8 | 42.0 | $8.68 \times 10^{-6}$ |
| 30 | −40.0 | 50.0 | $1.76 \times 10^{-12}$ |
| 40 | −49.6 | 57.1 | $-7.7 \times 10^{-6}$ |
| 50 | −64.1 | 62.7 | $-1.36 \times 10^{-5}$ |
| 60 | −84.0 | 65.5 | $-1.66 \times 10^{-5}$ |
| 70 | −105.6 | 64.6 | $-1.57 \times 10^{-5}$ |
| 80 | −123.2 | 60.4 | $-1.12 \times 10^{-5}$ |

In this case, the D value becomes substantially zero at the pitch rotation angle $\theta = 30$ degrees, and the value of the dip angle becomes 50 degrees. The value of the angle $\psi$ corresponding to the pitch rotation angle $\theta$ of 30 degrees is −40 degrees. Therefore, according to the above equation (24), the magnetic north direction angle becomes 130 degrees, which agrees with the magnetic north direction angle initially assumed. In other word, we successfully guessed the initially assumed magnetic north direction angle by employing the present invention. In this numerical example, the D value became substantially zero at the angle $\theta = 30$ degrees used for the calculation, because the assumed numerical example is composed of round numbers. Therefore, in this example, the interpolation formula equation (28) was not used. But it is possible to easily introduce the equation (28) when the $\theta$ value is not round number.

Here, another numerical example for comparing the magnetic north direction angle error in the case where the art of the present invention is used and the case where the conventional 2-dimensional geomagnetism sensor is used, is described.

Here, under the condition that the dip angle was set at 50 degrees and the pitch rotation angle was set at 0 and 30 degrees, errors of the magnetic north direction angle are calculated. The result is shown in Table 5.

TABLE 5

| | Art of the Present Invention | | Conventional Technology | |
|---|---|---|---|---|
| Magnetic North Direction Angle | Pitch Rotation Angle $\theta =$ 0 degrees | Pitch Rotation Angle $\theta =$ 30 degrees | Pitch Rotation Angle $\theta =$ 0 degrees | Pitch Rotation Angle $\theta =$ 30 degrees |
| −80 | 0 | 0 | 0 | −24.0 |
| −60 | 0 | 0 | 0 | −42.9 |
| −40 | 0 | 0 | 0 | −42.9 |
| −20 | 0 | 0 | 0 | −37.7 |
| 0 | 0 | 0 | 0 | −30.8 |
| 20 | 0 | 0 | 0 | −23.5 |
| 40 | 0 | 0 | 0 | −16.4 |

TABLE 5-continued

| | Art of the Present Invention | | Conventional Technology | |
|---|---|---|---|---|
| Magnetic North Direction Angle | Pitch Rotation Angle θ = 0 degrees | Pitch Rotation Angle θ = 30 degrees | Pitch Rotation Angle θ = 0 degrees | Pitch Rotation Angle θ = 30 degrees |
| 60 | 0 | 0 | 0 | −9.6 |
| 80 | 0 | 0 | 0 | −3.2 |
| 100 | 0 | 0 | 0 | 3.2 |
| 120 | 0 | 0 | 0 | 9.6 |
| 140 | 0 | 0 | 0 | 16.4 |
| 160 | 0 | 0 | 0 | 23.5 |
| 180 | 0 | 0 | 0 | 30.8 |
| 200 | 0 | 0 | 0 | 37.7 |
| 220 | 0 | 0 | 0 | 42.9 |
| 240 | 0 | 0 | 0 | 42.9 |
| 260 | 0 | 0 | 0 | 24.0 |

As shown in Table 5, in case of the pitch ratation angle is zero, i.e., when the sensor unit is placed on a level to the earth surface, the error of each magnetic north angle estimation both in the present invention and the conventional technology was zero. When the pitch rotation angle was set at 30 degrees, however, the error of the magnetic north angle estimation reaches as high as ±42.9 degrees in the conventional technology, while the error in the present invention is still zero. Therefore, the predominance of the present invention is clear.

The embodiment described above is simply intended to clarify the technical concept of, the present invention. Of course, the present invention should not be limited to the embodiment described above in interpreting the technical scope of the present invention. The present invention can be worked in variously modified fashions within the spirit of the present invention and within the scope defined by the accompanying claims.

For example, in the above-mentioned embodiment, the magnetic north detecting device of the present invention was applied to the navigation system of a cellular phone, however, can also be applied to other navigation system. Further, in the above-mentioned embodiment, an example of the algorithm of operation was show, but is not limited to it in the embodiment described above.

What is claimed is:

1. A magnetic north detecting device comprising:
   a 3-dimensional geomagnetism sensor unit including three geomagnetism sensors for detecting respective components of a geomagnetism magnetic field intensity in respective directions of three coordinate axes perpendicular to each other; and
   a 3-dimensional operation functional section for carrying out an operation on the basis of the components of the geomagnetism magnetic field intensity detected by the geomagnetism sensors included in the 3-dimensional geomagnetism sensor unit, and calculating a magnetic north direction of the geomagnetism,
   wherein the 3-dimensional operation functional section carries out the operation and calculates the magnetic north direction of the geomagnetism, based on two assumptions that:
   (i) at least one axis of three coordinate axes of the 3-dimensional geomagnetism sensor unit is level to the earth surface; and
   (ii) an angle of a geomagnetism magnetic field vector which is calculated from the components of the geomagnetism magnetic field intensity in respective directions of the three coordinate axes of the 3-dimensional geomagnetism sensor unit, referring to the earth surface, coincides with a dip angle of the geomagnetism which is assumed beforehand.

2. The magnetic north detecting device according to claim 1, wherein, if following coordinate rotations of (1) and (2) are carried out,
   (1) a first coordinate rotation for rotating a coordinate system in which the components Hxs, Hys, and Hzs are expressed, with a first angle around the Xs axis; and
   (2) a second coordinate rotation for rotating a first conversion coordinate system which is converted by the first coordinate rotation, with a second angle around the Zs' axis, where three axes of the first conversion coordinate system are expressed by Xs', Ys', and Zs',
   where the three coordinate axes of the 3-dimensional geomagnetism sensor unit are expressed by Xs, Ys, and Zs, respectively, and the components of the geomagnetism magnetic field intensity in the respective directions of the Xs, Ys, and Zs are expressed by Hxs, Hys, and Hzs, respectively, with the result that the first conversion coordinate system is converted to a second conversion coordinate system having axes of Xs", Ys", and Zs", and components of the geomagnetism magnetic field intensity in respective direction of the Xs", Ys", and Zs" are expressed by Hxs", Hys", and Hzs", respectively,
   the 3-dimensional operation functional section selects the first angle and the second angle to satisfy two conditions simultaneously that:
   (α) Hxs"=0; and
   (β) an angle of a geomagnetism magnetic field vector composed of the Hys" and Hzs" in a Ys"-Zs" plane, referring to the earth surface, coincides with the dip angle of the geomagnetism which is assumed beforehand,
   and a direction of the Ys" axis corresponding to the selected first angle and second angle is considered to be the magnetic north direction.

3. The magnetic north detecting device according to claim 2, wherein, where the first angle, the second angle, and the dip angle which is assumed beforehand are expressed by θ, ψ, and Φ, respectively, the θ and ψ are calculated to simultaneously satisfy following equations (a) and (b), and a direction rotating counterclockwise with an angle Θ which shown in a following equation (c) from the Xs axis is taken as the magnetic north direction $$Hxs \cos \psi + Hys \cos \theta \sin \psi + Hzs \sin \theta \sin \psi = 0 \quad (a)$$

$$\tan \Phi(-Hxs \sin \psi + Hys \cos \theta \cos \psi + Hzs \sin \theta \cos \psi) - Hys \sin \theta + Hzs \cos \theta = 0 \quad (b)$$

$$\Theta = \frac{\pi}{2} - \psi. \quad (c)$$

4. The magnetic north detecting device according to claim 3, wherein the 3-dimensional operation functional section includes a function for finding the θ such that a D value shown in a following equation (e) is substantially equal to zero, by repeating steps of a first step of assuming the θ, a second step of calculating the ψ by using a following equation (d), and a third step of calculating the D value by using the equation (e), in this order $$\psi = \tan^{-1}\left(\frac{-Hxs}{Hys\cos\theta + Hzs\sin\theta}\right) \quad (d)$$

$D = \tan\Phi(-Hxs \sin\psi + Hys \cos\theta \cos\psi + Hzs \sin\theta \cos\psi) - Hys \sin\theta + Hzs \cos\theta$  (e).

5. The magnetic north detecting device according to claim 1, wherein the 3-dimensional operation functional section includes a function for calculating an absolute value of the geomagnetism magnetic field intensity from the respective components of the geomagnetism magnetic field intensity in the respective directions of the three coordinate axes and carrying out a presumption calculation of the dip angle of the geomagnetism based on the calculated absolute value of the geomagnetism and a correlation data between absolute value of the geomagnetism and dip angle value.

6. A magnetic north detecting method performed by using a 3-dimensional geomagnetism sensor unit including three geomagnetism sensors for detecting respective components of a geomagnetism magnetic field intensity in respective directions of three coordinate axes perpendicular to each other, the method comprising;

detecting the respective components of the geomagnetism magnetic field intensity in the respective directions of the three coordinate axes by the three geomagnetism sensors; and carrying out an operation on the basis of the components of the geomagnetism magnetic field intensity detected by the geomagnetism sensors included in the 3-dimensional geomagnetism sensor unit, and calculating a magnetic north direction, wherein the operation is carried out to calculate the magnetic north direction of the geomagnetism, based on two assumptions that:

(i) at least one axis of three coordinate axes of the 3-dimensional geomagnetism sensor unit is level to the earth surface; and (ii) an angle of a geomagnetism magnetic field vector which is calculated from the components of the geomagnetism magnetic field intensity in respective directions of the three coordinate axes of the 3-dimensional geomagnetism sensor unit, referring to the earth surface, coincides with a dip angle of the geomagnetism which is assumed beforehand.

7. The magnetic north detecting method according to claim 6, wherein, if following coordinate rotations of (1) and (2) are carried out, (1) a first coordinate rotation for rotating a coordinate system in which the components Hxs, Hys, and Hzs are expressed, with a first angle around the Xs axis; and (2) a second coordinate rotation for rotating a first conversion coordinate system which is converted by the first coordinate rotation, with a second angle around the Zs' axis, where three axes of the first conversion coordinate system are expressed by Xs', Ys', and Zs', where the three coordinate axes of the 3-dimensional geomagnetism sensor unit are expressed by Xs, Ys, and Zs, respectively, and the components of the geomagnetism magnetic field intensity in the respective directions of the Xs, Ys, and Zs are expressed by Hxs, Hys, and Hzs, respectively, with the result that the first conversion coordinate system is converted to a second conversion coordinate system having axes of Xs", Ys", and Zs", and components of the geomagnetism magnetic field intensity in respective direction of the Xs", Ys", and Zs" are expressed by Hxs", Hys", and Hzs", respectively, in the operation a first angle and a second angle are selected to satisfy two conditions simultaneously that:

(α) Hxs"=0; and (β) an angle of a geomagnetism magnetic field vector composed of the Hys" and Hzs" in a Ys"-Zs" plane, referring to the earth surface, coincides with the dip angle of the geomagnetism which is assumed beforehand, and a direction of the Ys" axis corresponding to the selected first angle and second angle is considered to be the magnetic north direction.

8. The magnetic north detecting method according to claim 7, wherein, where the first angle, the second angle, and the dip angle which is assumed beforehand are expressed by θ, ψ, and Φ, respectively, the θ and ψ are calculated to simultaneously satisfy following equations (a) and (b), and a direction rotating counterclockwise with an angle Θ which shown in a following equation (c) from the Xs axis is taken as the magnetic north direction $Hxs \cos\psi + Hys \cos\theta \sin\psi + Hzs \sin\theta \sin\psi = 0$  (a)

$\tan\Phi(-Hxs \sin\psi + Hys \cos\theta \cos\psi + Hzs \sin\theta \cos\psi) - Hys \sin\theta + Hzs \cos\theta = 0$  (b)

$$\Theta = \frac{\pi}{2} - \psi. \quad (c)$$

9. The magnetic north detecting method according to claim 8, wherein, in the operation, the θ is found such that a D value shown in a following equation (e) is substantially equal to zero, by repeating steps of a first step of assuming the θ, a second step of calculating the ψ by using a following equation (d), and a third step of calculating the D value by using the equation (e), in this order $$\psi = \tan^{-1}\left(\frac{-Hxs}{Hys\cos\theta + Hzs\sin\theta}\right) \quad (d)$$

$D = \tan\Phi(-Hxs \sin\psi + Hys \cos\theta \cos\psi + Hzs \sin\theta \cos\psi) - Hys \sin\theta + Hzs \cos\theta$  (e).

10. The magnetic north detecting method according to claim 6, wherein, in the operation, an absolute value of the geomagnetism magnetic field intensity is calculated from the respective components of the geomagnetism magnetic field intensity in the respective directions of the three coordinate axes, and a presumption calculation of the dip angle of the geomagnetism is carried out based on the calculated absolute value of the geomagnetism and a correlation data between absolute value of the geomagnetism and dip angle value.

* * * * *